United States Patent [19]

Hansen et al.

[11] Patent Number: 4,878,802
[45] Date of Patent: Nov. 7, 1989

[54] MACHINE FOR COLLECTING GROUND PARTICLES AND THE LIKE

[75] Inventors: Loren F. Hansen, Lincoln; Donald J. Huber, deceased, late of Lincoln, by Lisa A. Huber, beneficiary; Joseph J. Oliver, Lincoln, all of Nebr.

[73] Assignee: Outboard Marine Corporation, Waukegan, Ill.

[21] Appl. No.: 160,617

[22] Filed: Feb. 26, 1988

[51] Int. Cl.$^4$ ............................................. B65G 65/02
[52] U.S. Cl. ................................... 414/523; 198/511; 414/488; 414/528; 414/917
[58] Field of Search ................ 414/486, 488, 501, 502, 414/503, 504, 505, 528, 523, 917; 198/511, 587, 861.1, 510.1, 520

[56] References Cited

U.S. PATENT DOCUMENTS

| | | | |
|---|---|---|---|
| 1,189,016 | 6/1916 | Thompson | 414/439 |
| 2,243,650 | 5/1941 | Poll | 198/520 |
| 2,556,409 | 6/1951 | Armstrong | 198/522 |
| 2,562,775 | 7/1951 | Crull | 56/328 |
| 2,615,586 | 10/1952 | Miller et al. | 414/505 |
| 2,709,011 | 5/1955 | Radin et al. | 198/522 |
| 2,776,036 | 1/1957 | Kling | 198/522 |
| 2,964,204 | 12/1960 | Wilson | 414/439 |
| 3,475,889 | 11/1969 | Overstreet et al. | 56/328 |
| 3,566,893 | 3/1971 | Richardson | 414/440 |
| 3,587,814 | 6/1971 | Garabedian et al. | 198/510.1 X |
| 3,675,802 | 7/1972 | Best et al. | 414/503 |
| 3,802,022 | 4/1974 | Fleming | 414/435 |
| 4,023,285 | 5/1977 | Hancock et al. | 414/488 X |
| 4,221,524 | 9/1980 | Morris | 414/439 |

FOREIGN PATENT DOCUMENTS 0631708 8/1963 Belgium ................................ 414/523

Primary Examiner—David A. Bucci
Attorney, Agent, or Firm—Welsh & Katz, Ltd.

[57] ABSTRACT

A machine for gathering and collecting particles from a ground surface or the like includes an upwardly inclined conveyor or elevator mounted on the side of a transport vehicle and having a lower receiving end cooperative with forwardly diverging gathering arms which guide particles on the ground surface to the receiving end of the conveyor for transfer to an upper conveyor end where the particles are discharged into a receptacle. The conveyor is supported on the transport vehicle by a rigid truss frame arrangement including upper and lower pivot arms having ball joint connection to the conveyor so as to allow rotation of the conveyor substantially about its longitudinal axis in response to changes in ground contour. The conveyor is movable between lowered operating and raised transport positions. Counterbalance springs limit the contact force of the conveyor acting on the ground surface during operation.

15 Claims, 4 Drawing Sheets

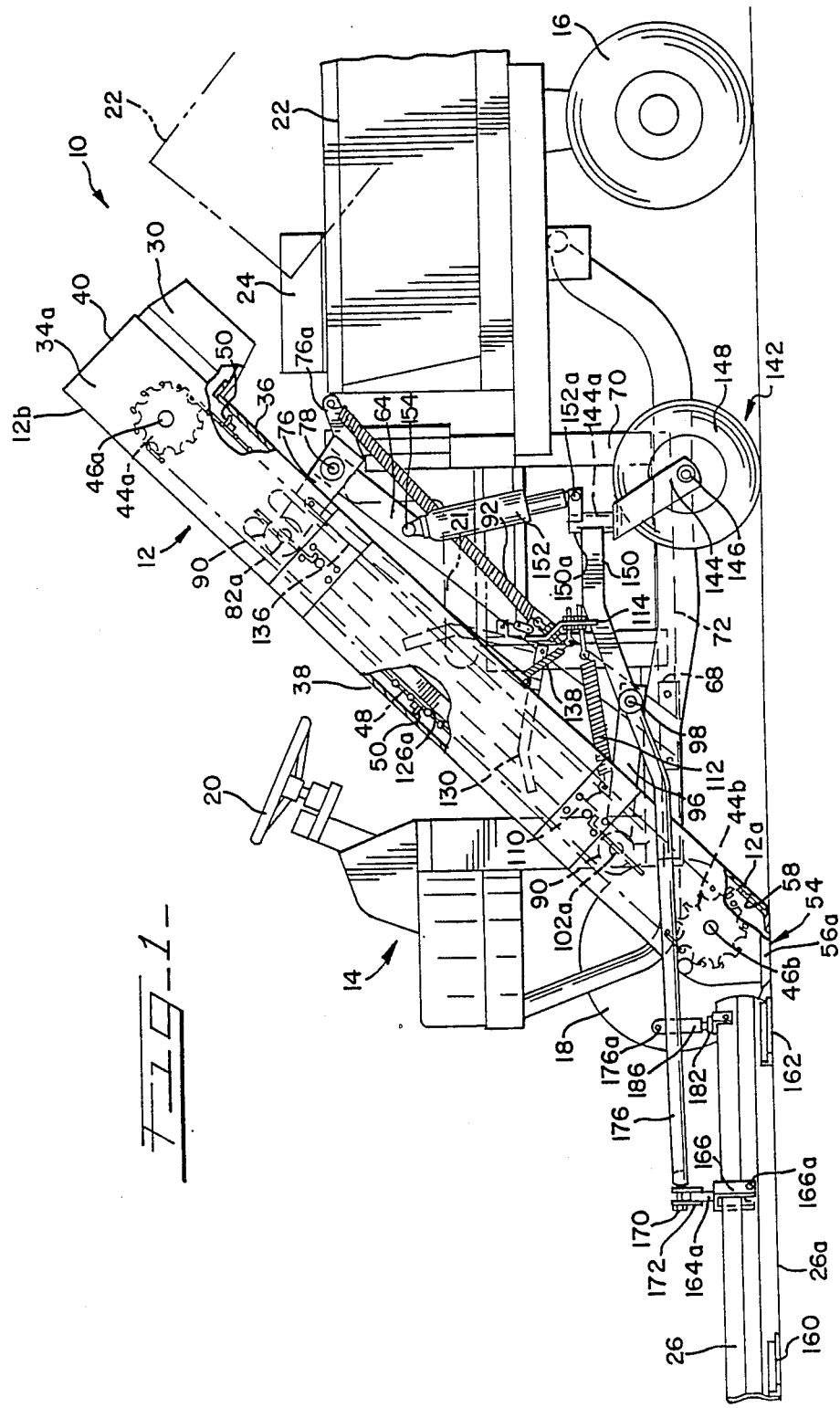

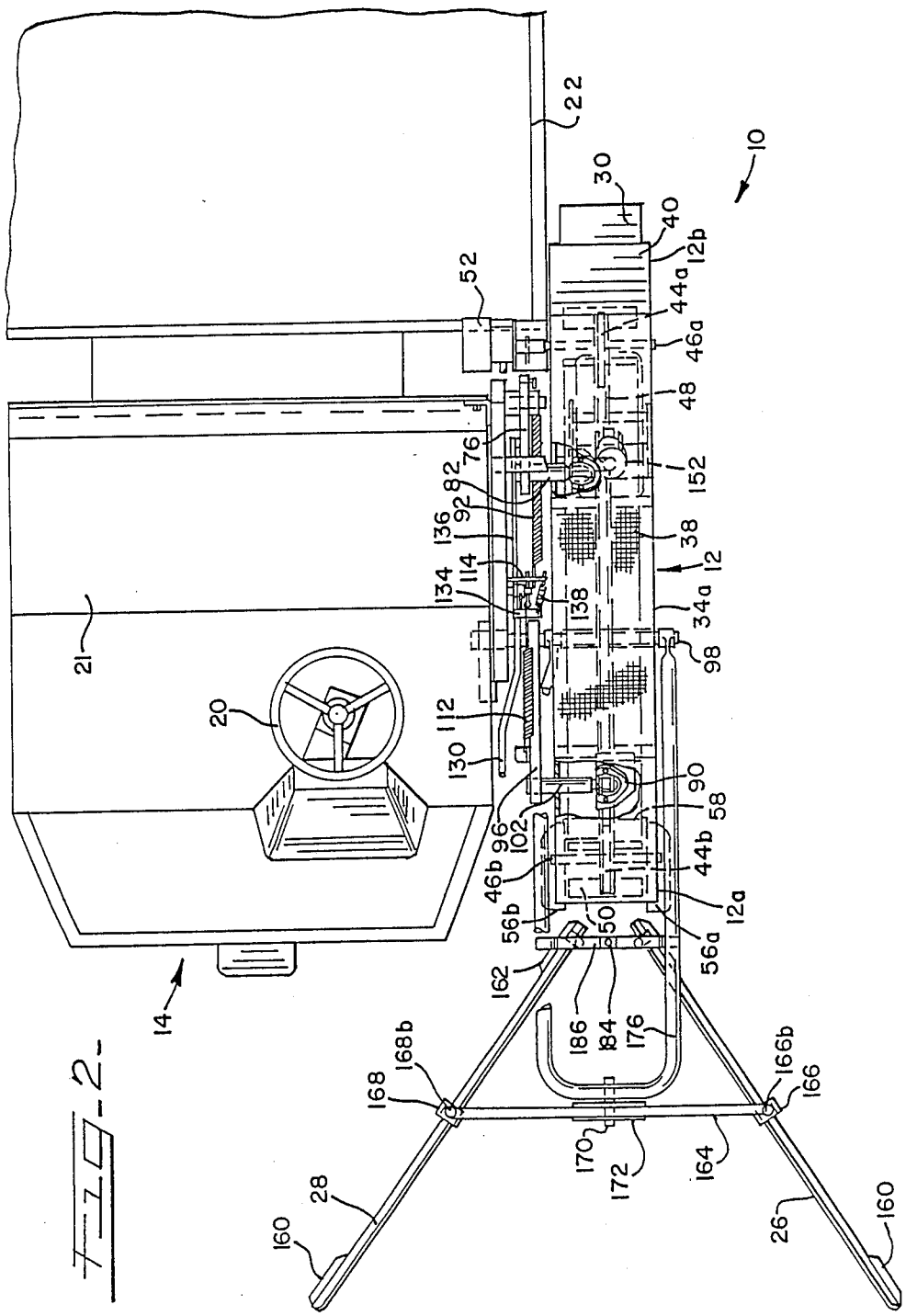

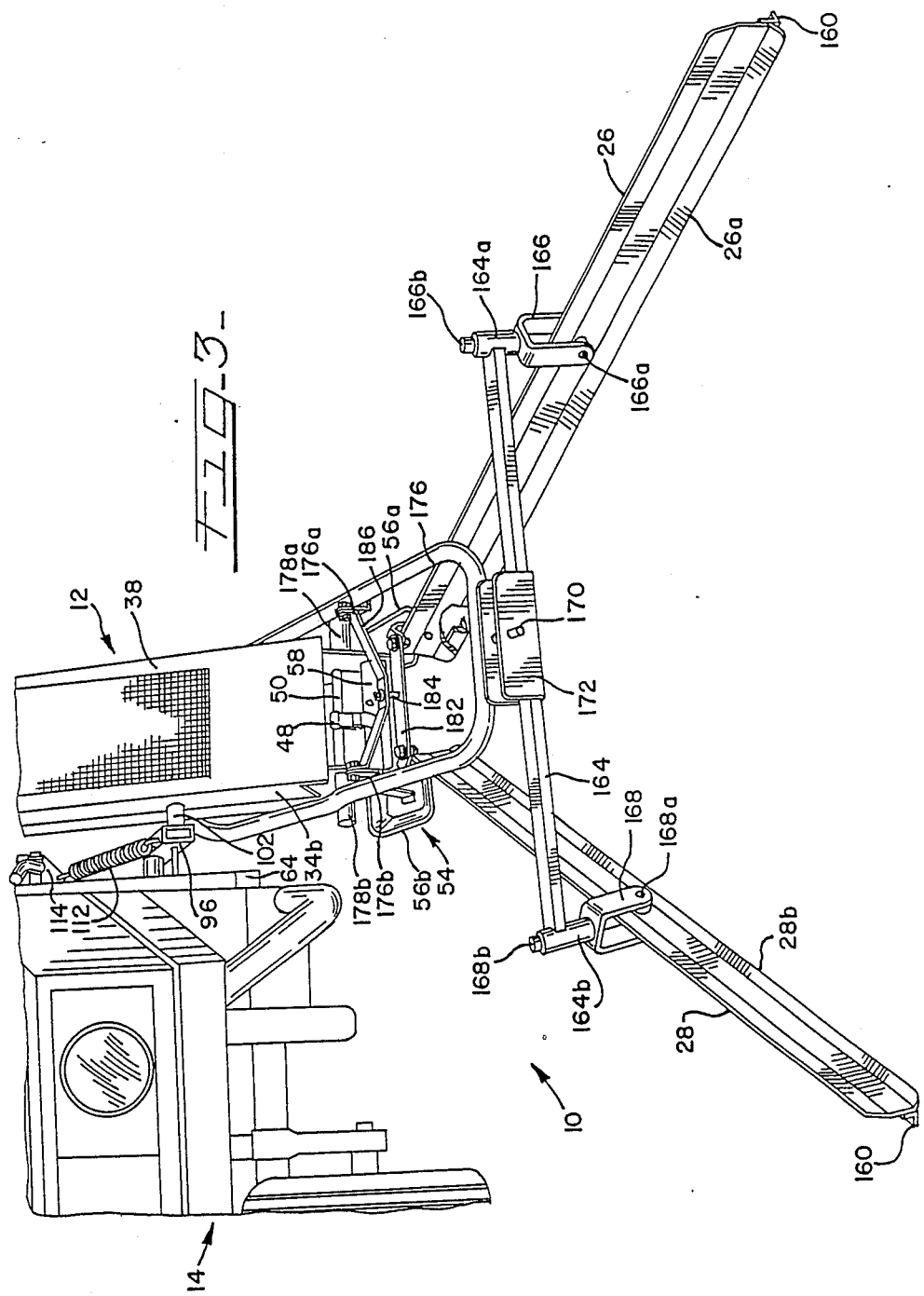

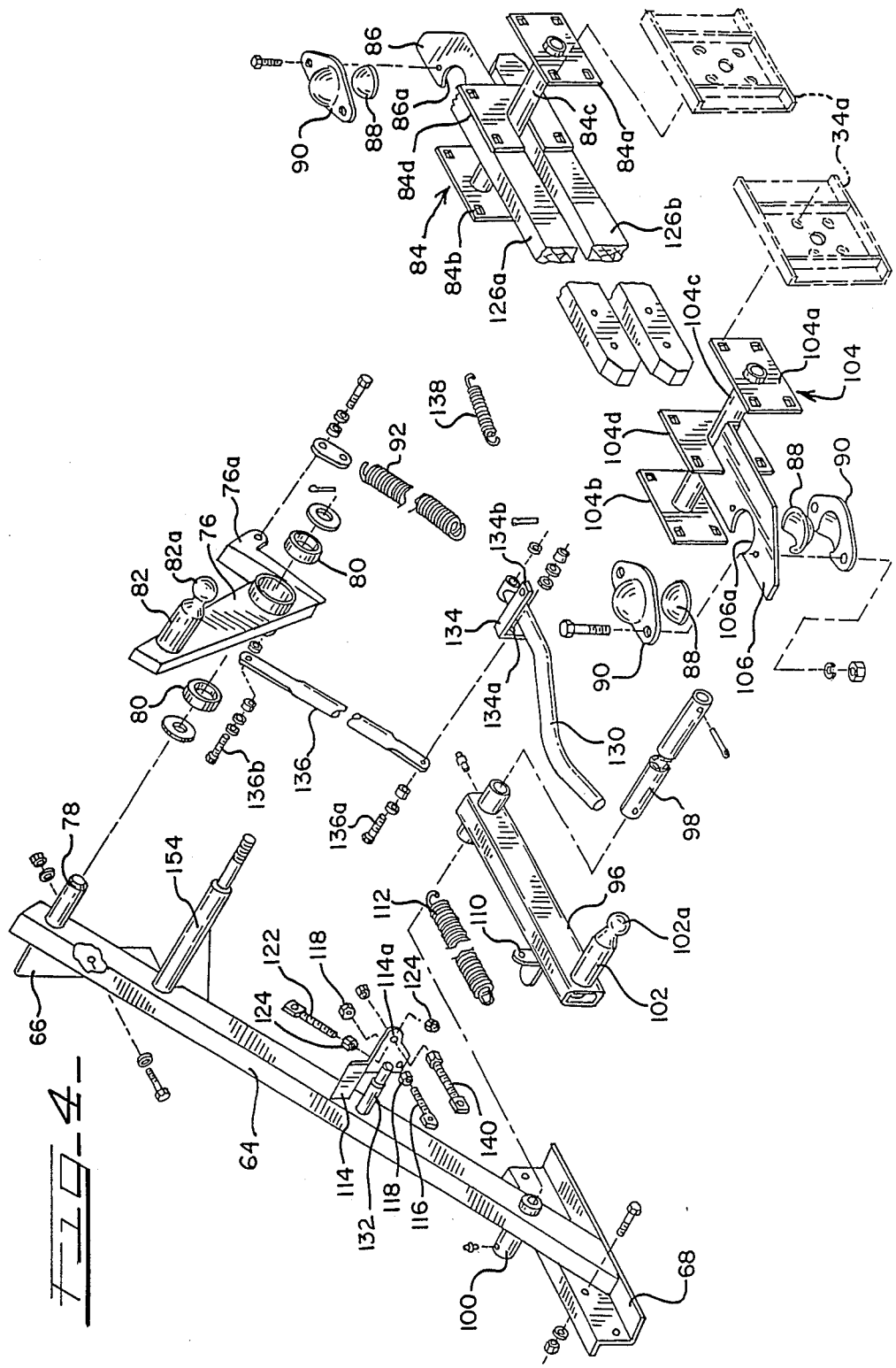

MACHINE FOR COLLECTING GROUND PARTICLES AND THE LIKE

BACKGROUND OF THE INVENTION

The present invention relates generally to machines for gathering and collecting particles disposed on a ground surface or the like, and more specifically to such a machine which finds particular application in gathering turf plugs or core particles resulting from aeration of a turf surface.

Machines operative to traverse a ground surface or the like for gathering and collecting particles or articles disposed on the ground and conveying the articles to a receptacle for further disposal are generally known. Such machines frequently employ an upwardly inclined conveyor which is mounted on a transport vehicle and has a lower forward end cooperative with gathering blades or the like to guide particles disposed on the ground surface to the receiving end of the conveyor which conveys the particles to a receiving receptacle. Various forms of such machines find application in harvesting agricultural products, as maintenance machines for collecting and removing debris from the floor of an industrial facility or from streets and the like, and in special use applications such as in retrieving golf balls and the like when scattered on a ground surface such as at a practice range. A desirable feature of such machines, and particularly those employed to traverse a turf surface for gathering and collecting particles therefrom, is that the conveyor and associated gathering arms or blades be capable of maintaining optimum ground orientation over uneven or varying ground contours.

SUMMARY OF THE INVENTION

A general object of the present invention is to provide a novel machine for gathering and collecting particulate materials disposed on a ground surface or the like.

A more particular object of invention is to provide a novel machine which finds particular application in gathering and collecting turf cores or plugs disposed on a turf surface following ground aeration, and wherein the machine is operative to maintain optimum ground orientation over uneven or varying ground contours.

A further object of the present invention is to provide a novel machine for gathering and collecting turf cores or plugs, or other articles, from a ground surface or the like and conveying the plugs to a receptacle, wherein the machine includes an upwardly inclined conveyor carried along the side of a transport vehicle and having a lower receiving end cooperative with forwardly diverging gathering arms to gather particles disposed on the ground surface and guide them to the conveyor on which the particles are conveyed to a receptacle for subsequent disposal. The conveyor is supported through a truss frame arrangement including ball joints supporting the conveyor so as to enable rotation substantially about its longitudinal axis in response to variations in ground contour as the machine traverses the ground. The supporting truss frame arrangement also enables the operator to readily raise the conveyor during transport between working locations.

A feature of the gathering and collecting machine in accordance with the invention lies in forming the truss frame arrangement as a generally parallelogram linkage arrangement which supports the upwardly inclined conveyor on ball joints for rotation substantially about its longitudinal axis, and wherein the lower receiving end of the conveyor is raised vertically a greater distance than the upper end of the conveyor when the conveyor is raised for transport, the lower end of the conveyor being cooperative with forwardly diverging gathering arms supported to maintain optimum ground contact during variations in ground contour.

A further feature of the article gathering and collecting machine in accordance with the invention lies in the provision of a shock absorbing support wheel to support the conveyor and prevent side movements from acting on the transport vehicle due to side mounting of the conveyor.

Further objects, features and advantages of the present invention, together with the organization and manner of operation thereof, will become apparent from the following detailed description of the invention when taken in conjuction with the accompanying drawings wherein like reference numerals designate like elements throughout the several views.

BRIEF DESCRIPTION OF THE DRAWINGS

FIG. 1 is a fragmentary side elevational view of a harvester machine for gathering and collecting ground particles and the like constructed in accordance with the present invention, portions being broken away for clarity;

FIG. 2 is a fragmentary plan view of the machine illustrated in FIG. 1, portions being broken away for clarity;

FIG. 3 is a fragmentary front perspective view of the machine illustrated in FIGS. 1 and 2; and FIG. 4 is an exploded perspective view of the truss frame arrangement for supporting the conveyor on a transport vehicle as in FIGS. 1-3.

DETAILED DESCRIPTION

Referring now to the drawings, and in particular to FIGS. 1-3, a machine constructed in accordance with the present invention for gathering and collecting particles or articles disposed on a ground surface or the like is indicated generally at 10. The machine 10 finds particular application in gathering and collecting turf cores or plugs which are formed by a tubular tine type aerator and deposited on a turf surface such as the putting green and adjacent play area of a golf course or a groomed lawn from which it is often desirable to remove the turf cores. In such applications the machine 10 may be termed a core harvester. Alternatively, the machine 10 may be employed for gathering and collecting other particulate materials or articles such as nuts and bolts from the floor surface of a manufacturing facility or the like, or golf balls or on a golf practice range.

Briefly, the machine 10 includes an upwardly inclined conveyor or elevator, indicated generally at 12, which is mounted on the side of a motorized transport vehicle, indicated generally at 14. In the illustrated embodiment, the transport vehicle 14 comprises a commercially available motorized utility vehicle having a pair of driven rear wheels 16 and a single forward wheel 18 steerable through a steering wheel 20 by an operator sitting on a seat 21. A generally rectangular open top receptacle or bed 22 is carried on the rearward end of the transport vehicle and may be pivoted upwardly to facilitate dumping in a known manner. Preferably, a transverse endless belt type conveyor, indicated schematically at 24 in FIG. 1, is supported on the forward end of the receptacle 22 to receive particles from the conveyor 12 and facilitate selective distribution of the particles throughout the receptacle.

The inclined conveyor or elevator 12 has a lower entry end 12a which is cooperative with article gathering means in the form of a pair of forwardly diverging gathering arms or blades 26 and 28. During normal operation, the gathering arms 26 and 28 are supported to engage the turf or ground surface and guide turf cores or plugs, or other particles or articles being collected, to the lower entry end of conveyor.

The conveyor 12 is operative to convey the gathered particles to an upper discharge end 12b for discharge through a chute 30 onto the transverse conveyor 24 for deposit into the receptacle or dump bed 22. Alternatively, the chute may be configured to deposit particles form the conveyor directly into the receptacle 22.

Turning now to a more detailed description of the gathering and collecting machine 10, the conveyor or elevator 12 includes an outer housing or shell of substantially rectangular transverse cross-sectional configuration having a pair of parallel side plates 34a and 34b connected at their longitudinal marginal edges to a bottom wall or channel 36 and an upper cover plate 38 which may be perforated to reduce weight and enable visual internal inspection. The upper end of the conveyor is closed by an end plate 40. The chute 30 may be made of a rubber material and is secured to the bottom wall 36 peripherally of a rectangular discharge opening formed in the bottom wall adjacent the upper end 12b of the conveyor.

A pair of chain support and drive sprockets 44a and 44b are supported, respectively, on transverse support shafts 46a and 46b the axes of which transversely intersect the longitudinal axis of the conveyor adjacent its upper and lower ends. The sprockets 44a,b support an endless chain 48 centrally between the conveyor side walls 34a and 34b with the reaches of chain between the sprockets being equally spaced from the lower and upper walls 36 and 38 of the conveyor housing. The chain 48 carries a plurality of transverse rigid paddles 50 at equidistantly spaced positions along its length, the paddles being configured such that their outer free edges are closely adjacent the upper surface of the bottom conveyor wall 36 as the chain is driven in a counterclockwise direction, as considered in FIG. 1. Drive means in the form of a hydraulic drive motor 52 is mounted on the conveyor side wall 34b and coupled in driving relation to the upper sprocket support shaft 36a so as to effect positive driving rotation of the chain 48 and associated paddles 50. The upper drive sprocket 44a and its support shaft 46a are supported in a manner enabling adjustment longitudinally of the conveyor to facilitate selective tensioning of the paddle drive chain 48.

The lower end 12a of the conveyor or elevator 12 has a shoe assembly 54 affixed thereto which includes a pair of laterally spaced ground contact pads 56a and 56b extending outwardly from the corresponding conveyor side walls 34a and 34b. An upwardly inclined plate 58 is fixed to and between the ground engaging pads 56a,b and overlies the lower end of conveyor wall 36 such that a lower free edge of plate 58 serves to guide gathered particles upwardly for engagement by the conveyor paddles 50.

In accordance with one feature of the machine 10, the conveyor or elevator 12 is mounted on the transport vehicle 14 through a rigid truss frame arrangement which enables rotation of the conveyor substantially about its longitudinal axis so as to maintain desired orientation of the conveyor and associated gathering arms 26 and 28 to the ground surface under varying ground contour conditions. To this end, the rigid truss frame arrangement includes an elongated rigid frame member 64 having an upper angle mounting bracket 66 and a lower angle mounting bracket 68 affixed thereto. The upper and lower mounting brackets 66 and 68 facilitate rigid mounting of the frame member 64 on the transport vehicle 14, the mounting bracket 66 being affixed to an upstanding frame member 70 of the transport vehicle through suitable mounting screws, while the lower mounting bracket 68 is affixed to a generally horizontal frame rail 72 of the transport vehicle.

The truss frame member 64 pivotally supports an upper link or pivot arm 76 on a stub shaft 78 through suitable bearings 80 (FIG. 4), the stub shaft 78 being fixed in normal relation to frame member 64. The upper pivot arm 76 has a cantilevered support arm 82 parallel to stub shaft 78 and on which is formed a substantially spherical ball end 82a. The support arm 82 extends through the conveyor sidewall 34b and forms a ball joint connection with an upper pivot assembly, indicated generally at 84 in FIG. 4, internally of the conveyor housing. The pivot assembly 84 includes a planar mounting plate 86 having an open-sided generally circular recess 86a formed therein. The ball 82a is captured within the recess 86a by upper and lower generally semi-spherical concave bushings 88 and associated ball joint caps 90 adapted to be affixed to the mounting plate 86 so as to capture the ball 82a and establish pivotal ball joint support of the upper end of the conveyor on the upper link or pivot arm 76. A leg extension 76a on pivot arm 76 facilitates attachment of a counterbalance coil tension spring 92 as will be more fully described below.

The truss frame member 64 also pivotally supports a lower link or pivot arm 96 through a cylindrical pivot shaft 98 having one end mounted within a tubular support 100 which is fixed to the frame member 64 in parallel relation to the stub shaft 78. The lower pivot arm 96 has a cantilevered support arm 102 parallel to pivot shaft 98 and having a substantially spherical ball 102a formed on its free end. The support arm 102 extends through conveyor wall 34b and forms a ball joint connection with a lower pivot assembly, indicated generally at 104, in generally similar fashion to the ball joint connection between the support arm 82 and the upper pivot assembly 84. To this end, the lower pivot assembly 104 has a mounting plate 106 in which an opensided generally circular recess 106a is formed to receive the ball 102a and enable it to be captured therein by concave bushings 88 and associated ball joint caps 90 so as to form a ball joint connection between the support arm 102 and the pivot assembly 104.

The lower link or pivot arm 96 has a bracket 110 affixed thereon adapted for connection to an end of a counterbalance spring in the form of a coil tension spring 112 which has its opposite end connected to a spring anchor bracket 114 fixed to the truss frame member 64. The counterbalance spring 112 biases the pivot arm 96 in a clockwise direction about its pivot axis 98, as viewed in FIG. 1, and is connected to anchor bracket 114 through an adjustable eyelet screw 116 which is longitudinally adjustable relative to anchor bracket by means of nuts 118 threaded onto the screw on opposite sides of the anchor bracket so as to enable selective adjustment of the counterbalance force applied by spring 112 to pivot arm 96.

The spring anchor bracket 114 also serves as an attachment anchor for the end of the counterbalance coil spring 92 opposite its connection to the leg 76a of the upper link 76. For this purpose, an eyelet screw 122 has its eyelet end connected to the counterbalance spring 92 and is longitudinally adjustable relative to the anchor bracket 114 through nuts 124 threaded onto the screw 122 on opposite sides of the anchor bracket 114. Adjustment of the screw 122 relative to the anchor bracket enables adjustment of the counterbalance force applied by the spring 92 to the upper pivot arm 76 in biasing the upper pivot arm in a clockwise direction about its mounting shaft 78, as considered in FIG. 1.

The upper and lower pivot assemblies 84 and 104 have pairs of end plates 84a, 84b and 104a, 104b, respectively, which are fixed transversely on opposite ends of corresponding support shafts 84c and 104c. The ball joint mounting plates 86 and 106 are affixed to the support shafts 84c and 104c, respectively, so as to lie in radial planes containing the longitudinal axes of the corresponding shafts 84c and 104c. The mounting plates 84a,b and 104a,b are secured to and between the conveyor side plates 34a,b so that the support shafts 84c and 104c are normal to the side plates, and the ball socket mounting plates 86 and 106 lie in a common plane spaced upwardly from and parallel to a plane normal to the side plates 34a,b and containing the longitudinal centerline of the conveyor. The support shafts 84c and 104c have mounting plates 84d and 104d, respectively, fixed transversely thereon intermediate the corresponding end plates 84a,b and 104a,b. A pair of wooden members 126a and 126b have their opposite ends secured to the mounting plates 84d and 104d so as to extend longitudinally of the conveyor in substantially equally spaced relation from the lower and upper conveyor walls 36 and 38. The elongated members 126a and 126b are slightly wider than the chain 48 and provide backup support for the reaches of the endless chain intermediate the chain sprockets 44a,b.

Referring to FIG. 2, the support arm 102 on the lower pivot arm 96 and its ball joint connection to the lower pivot assembly 104 are such that the center of ball joint 102a lies substantially in a vertical plane containing the longitudinal centerline of the conveyor 12. The support arm 82 on the upper pivot arm 76 and its ball joint connection to the upper pivot assembly 84 are configured such that the center of ball joint 82a is spaced from the aforementioned vertical plane containing the longitudinal axis of the conveyor 12a sufficient distance to offset or nullify any bending moment otherwise created on the conveyor by the side mounted hydraulic drive motor 52 were the center of ball joint 82a to lie in the vertical plane containing the longitudinal axis of the conveyor. It will be appreciated that the ball joint support arrangement for the conveyor 12 enables the conveyor to undergo limited rotation about a line passing through the centers of the ball joints 82a and 102a. The offset of the ball joint 82a from the longitudinal center of the conveyor is relatively minor so that the conveyor may be said to rotate substantially about its longitudinal axis. By positioning the ball joint support plates 86 and 106 so as to lie in a plane spaced above and parallel to a plane normal to the conveyor side plates 34a,b and containing the longitudinal center of the conveyor, the center of gravity of the conveyor, as considered in a section plane transverse to the conveyor, is below is straight line passing through the ball joint centers, thus creating a pendulum effect which biases the conveyor to a position wherein the sideplates 34a,b are disposed in substantially vertical planes.

With the conveyor or elevator 12 supported on the transport vehicle 14 through the main truss member 64 and the upper and lower pivot arms 76 and 96 and associated ball joints, a generally parallelogram linkage arrangement is established by the truss member 64, the pivot arms 76 and 96 and the conveyor 12 through its ball joint connections to the pivot arms. Such parallelogram linkage arrangement allows the conveyor 12 to be moved between a lowered position wherein the ground-engaging pads 56a,b engage the ground or turf surface being traversed, and a raised position facilitating transport of the conveyor in a nonoperative position. To facilitate such movement of the conveyor, a control or operating handle or lever 130 is pivotally mounted at one end on a pivot shaft 132 fixed in normal relation to the frame member 64 adjacent the spring anchor bracket 114. The control handle 130 has a generally L-shaped bracket 134 mounted thereon which has a pair of mounting holes 134a and 134b. The operating handle 130 is interconnected to the upper pivot arm 76 through a fixed length connecting arm 136 having one end pivotally connected to the bracket 134 through a screw 136a fixed within the hole 134a. The opposite end of arm 136 is pivotally connected to the upper pivot arm 76 through a screw 136b. In this manner, movement of the control handle 130 about its pivot support shaft 132 is operative to effect a corresponding pivotal movement of the upper and lower pivot arms 76 and 96 and a corresponding raising or lowering of the conveyor.

During operation of the machine 10 to gather and collect particles disposed on a turf or ground surface, the operating handle 130 is lowered to its forward pivotal position as illustrated in FIG. 1 such that the shoe pads 56a,b engage the turf surface. The counterbalance springs 92 and 112 are selected to counterbalance the weight of the conveyor 12 such that the ground engaging pads 56a,b engage the ground or turf surface with a relatively light contact force. In the lowered operating position, the lower pivot a 96 is inclined upwardly from horizontal relative to its pivot axis 98 so that any reaction force acting on the lower forward end of the conveyor during traverse, due to a change in ground contour such as a bump or the like, tends to raise the conveyor. This action prevents the ground contact shoes 56a,b from digging into or otherwise damaging the underlying ground or turf surface, and is particularly advantageous when traversing a golf putting green or adjacent area where smooth well-groomed turf surfaces must be maintained.

During transport of the machine 10 to and from work or operating sites, the conveyor or elevator 12 is raised so that the ground engaging shoe pads 56a,b and gathering arms 26 and 28 are raised above the ground or turf surface. Raising the conveyor is effected by the operator pulling upwardly on the operating handle 130 until the handle engages the upper stop edge of the spring anchor 114. Such upward pivotal movement of the operating handle acts through the connecting arm 136 to cause a corresponding upward pivotal movement of the upper and lower pivot arms 76 and 96. The lower link or pivot arm 96 is of greater length between its pivot axis 98 and the support arm 102 than the length of the upper link or pivot arm 76 between its pivot axis 78 and the support arm 82 so that the lower end of the conveyor is raised a greater vertical distance than the upper end of the conveyor. A coil tension spring 138 has its opposite ends connected, respectively, to the bracket 134 on the control handle 130, as through opening 134b, and the spring anchor bracket 114, as through an eyelet screw 140 longitudinally adjustable within a hole 114a in the anchor bracket, such that the tension force applied to the control handle by spring 138 may be selectively adjusted. As the control handle 130 is pivoted upwardly to raise the conveyor to a non-operating position, the control handle and its connection to spring 138 pass through a vertical plane containing the pivot axis 132, or overcenter. The spring 138 is selected so that it maintains the control handle in its upwardly pivoted or overcenter position and prevents inadvertent or accidental return of the control handle to its lowered position with a corresponding lowering of the conveyor until the operator manually overcomes the spring force. The tension spring 134 and its mounting geometry are such that the spring applies a minimal downward biasing action on the operating handle 13 when in its lowered operating position.

To prevent the side mounted conveyor or elevator 12 from creating a side loading moment on the transport vehicle 14 and thereby enable the transport vehicle to maintain a generally even disposition on the ground or turf surface, a caster wheel pivot assembly, indicated generally at 142, is mounted on the truss frame member 64 so as to counteract the weight of the conveyor 12. The caster wheel pivot assembly 142 includes a generally inverted U-shaped yoke 144 which has its lower ends secured to the opposite ends of an axle 146 on which a pneumatic tire and wheel assembly 148 is rotatably supported. An upwardly extending pivot shaft 144a is fixed to the yoke 144 and is rotatable within a sleeve 150a fixed on the trailing end of a support arm 150. The forward end of the support arm 150 pivotally supported on the aforedescribed pivot shaft 98 such that the wheel 148 may rotate about shaft 98 as well as about the axis of pivot shaft 144a. A pneumatic type shock absorber 152 has its piston end pivotally connected at 152a to the sleeve 150a on the pivot arm 150, and has its opposite end connected to a mounting shaft 154 which is rigidly fixed perpendicular to the truss frame member 64. The pneumatic shock absorber 152 is pressurized sufficiently to cause the caster wheel assembly to counterbalance or offset the weight of the conveyor 12 otherwise acting on the transport vehicle 14, thereby enabling the transport vehicle to maintain a substantially level orientation relative to the ground surface being traversed.

The gathering arms 26 and 28 are supported forwardly of the lower forward end 12a of the inclined conveyor 12 so as to maintain ground contact irrespective of variations in ground contour as the conveyor traverses the ground surface in its lowered operating position. The gathering arms 26 and 28 comprise elongated rigid arms or blades having generally straight lower edges 26a and 28a, respectively. Preferably, outwardly extending ground engaging pads are mounted on the gathering arms adjacent their lower edges at the forward and rearward ends thereof, as indicated at 160 and 162. The pads 160 and 162 maintain the lower edges 26a and 28a of the gathering arms raised slightly above the ground surface.

The gathering arms or blades 26 and 28 have mutually facing generally concave surfaces and are supported intermediate their lengths by a crossbar 164. The crossbar 164 has its opposite ends pivotally connected to the gathering arms through yokes 166 and 168 and associated transverse pivot pins 166a and 168a. The yokes 166, 168 are rotatable about axes transverse to the crossbar 164 through pivot shafts 166b and 168b rotatable within corresponding sleeves 164a and 164b fixed transversely to the ends of the crossbar 164. The crossbar 164 is pivotally supported at its midlength on a pivot pin 170 received through a generally U-shaped bracket 172 on the crossbar. The pivot 170 is fixed to the forward end of a generally U-shaped tubular pivot frame 176 which has its rearward ends pivotally supported on the pivot shaft 98 so that the pivot frame is generally free to rotate in a plane transverse to pivot shaft 98. A pair of axially aligned stub shafts or stop pins 178a and 178b are fixed to and extend outwardly from the conveyor side plates 34a and 34b, respectively, so as to engage the pivot frame 176 and limit its downward pivotal movement during raising of the conveyor. The stop pins 178a,b are positioned to allow the gathering blades 26, 28 to readily follow the contour of the ground surface during normal operating traverse of the machine 10.

The rearward ends of the gathering arms or blades 26 and 28 are pivotally connected to a tie bar 182 which is pivotally suspended intermediate its length on a tie rod 184 so as to allow rocking movement of tie bar 182 relative to rod 184. The upper end of tie rod 184 is connected to a transverse support bracket 186 having its opposite ends pivotally connected to brackets 176a and 176b on the pivot frame 176. In this manner, when the conveyor 12 is lowered to an operating position, the forwardly diverging gathering arms or blades 26 and 28 are disposed in generally floating relation to the underlying ground surface so as to follow the contour of the ground during traverse. When the conveyor is raised to a transport position by upward pivotal movement of the operating handle 130, the stub shafts 178a,b engage the pivot frame 176 to effect raising of the gathering arms with the conveyor.

Thus, in accordance with the present invention, a machine is provided for effectively gathering and collecting particles disposed on a ground surface or the like during traverse of the machine over the ground surface. As the machine undergoes forward movement, the gathering arms 26 and 28 gather the ground particles and guide them toward the receiving end 12a of the conveyor or elevator where the particles are guided upwardly by the crossplate 58 and engaged by successive paddles 50 on the conveyor chain 48. The paddles 50 move the particles upwardly to the discharge chute 30 from which the particles drop onto the transverse conveyor 24 and are deposited into the dump bed 22 on the transport vehicle.

During traverse of the ground or turf surface, variations in turf or ground contour are accommodated by the ability of the gathering arms or blades 26 and 28 to undergo articulated movement about the various pivot axes 166a, 166b, 168a, 168b, 170, and 184 relative to the pivot frame 176. The ground engaging pads 56a and 56b are adapted to accommodate varying ground contour while maintaining substantially equal weight distribution between the pads due to the ability of the upwardly inclined conveyor to rotate or pivot substantially about its longitudinal axis in response to a greater ground reaction force acting on one of the pads 56a,b than the other. This action, along with the tendency of the conveyor 22 to move upwardly when a bump or sudden rise in the ground is encountered, prevents the pads 56a,b from digging into or otherwise damaging the underlying ground surface when traversing an undulating ground surface.

When it is desired to move the machine between work areas, or to dump collected particles or articles from the dump bed 22, the conveyor 12 is raised by pivoting the operating handle 130 upwardly to raise both the upper and lower ends of the conveyor, the lower end being raised a greater distance than the upper end. The upper link or pivot arm 76 is configured to move the upper discharge end of the conveyor 12 to a position allowing the dump bed and associated transverse conveyor 24 to move freely upwardly to a dump position without interference with the conveyor. The chute 30 is of sufficient resiliency to accommodate engagement with the transverse conveyor 24 during dumping without interfering with desired operation.

Although the gathering and collecting machine 10 finds particular application in gathering and collecting turf plugs or cores resulting from aerating a turf surface, such as on golf courses and groomed lawn surfaces, it will be appreciated that the machine 10 may also be employed to gather and collect other materials or articles such as nuts and bolts disposed on an industrial floor surface, or golf balls at a golf driving range or the like.

While a preferred embodiment of the invention has been illustrated and described, it will be understood that changes and modifications may be made therein without departing from the invention in its broader aspects. Various features of the invention are defined in the following claims.

What is claimed is:

1. A machine for gathering particles from a ground surface and the like and being attachable to a self-propelled vehicle, comprising, in combination,
an upwardly inclined conveyor operative to receive particles at a lower receiving end and convey the particles longitudinally of the conveyor to an upper discharge end,
gathering means cooperative with said lower receiving end of said conveyor for guiding particles disposed on the ground surface to said receiving end of said conveyor as the machine traverses the ground surface,
and means supporting said conveyor on the vehicle in an upwardly inclined orientation, said support means including a truss frame arrangement having ball joint means supporting said conveyor for rotation substantially about its longitudinal axis in response to changes in surface contour so as to enable said conveyor and gathering means to maintain a predetermined operating orientation to the ground surface, said truss frame arrangement including linkage means enabling an operator to raise said conveyor above the ground surface to a nonoperating position for transport, said truss frame arrangement including a substantially parallelogram linkage arrangement having a pair of pivot arms supported for pivotal movement about discrete parallel pivot axis and having cantilevered support arms defining said ball joint means which are cooperative with said conveyor so as to enable rotation of said conveyor substantially about its longitudinal axis.

2. A machine as defined in claim 1 wherein said conveyor has ground engaging means at said lower receiving end operative to engage the underlying ground surface during operation, said truss frame arrangement including counterbalance means operative to limit the pressure applied by said ground engaging means to the ground surface.

3. The machine as defined in claim 2 wherein said counterbalance means includes counterbalance spring means selectively adjustable to vary the pressure applied by said ground engaging means to the ground surface.

4. A machine as defined in claim 1 wherein said conveyor has an endless chain supported longitudinally thereof on support sprockets, said chain having a plurality of transverse paddles operative to convey particles from said lower entry end to said upper discharge end, and including drive means mounted on said conveyor to enable driving rotation of at least one of said support sprockets, said ball joints interconnecting said support arms to said conveyor so as to effect a balance of said conveyor about a straight line intersecting the centers of said ball joints.

5. A machine as defined in claim 1 wherein the vehicle has a receptacle thereon, said discharge end of said conveyor being operative to discharge particles into the receptacle.

6. A machine as defined in claim 1 including counterbalance spring means operatively associated with said pivot arms so as to counterbalance the weight of said conveyor acting on the ground surface during operation.

7. A machine as defined in claim 6 including adjustment means cooperative with said counterbalance spring means to enable selective adjustment of the counterbalance force applied to said pivot arms.

8. A machine as defined in claim 1 wherein said conveyor includes ball joint connecting plates cooperative with said ball joints to define a ball joint connections between each of said support arms and said conveyor, said ball joint connections having centers lying in a plane spaced above the longitudinal centerline of said conveyor such that said conveyor is biased by gravity to a predetermined orientation relative to the ground surface.

9. A machine as defined in claim 1 wherein said pivot arms define upper and lower pivot arms movable between first positions wherein said conveyor is in ground engaging relation, and second positions operative to raise said conveyor for transport, said pivot arms being inclined upwardly and forwardly when in their first positions such that ground reaction forces acting on said conveyor tend to raise said conveyor.

10. A machine as defined in claim 1 wherein said gathering means includes a pair of forwardly diverging gathering arms supported forwardly of said conveyor receiving end so as to enable said gathering arms to maintain ground contact irrespective of varying ground contour.

11. The machine as defined in claim 10 including a support frame supported forwardly of said receiving end of said conveyor for pivotal movement about an axis substantially transverse to said conveyor, said gathering arms being pivotally suspended from said support frame so as to enable variable orientation of said arms relative to said support frame.

12. A machine as defined in claim 1 including an operating handle operatively associated with said pivot arms so as to enable selective pivotal movement of said pivot arms between lower conveyor operating positions and raised conveyor transport positions, and biasing means cooperative with said operating handle to releasibly maintain it in a position wherein said pivot arms are in their said raised positions.

13. A machine as defined in claim 12 wherein said biasing means comprises a tension spring coupled to said operating handle so as to apply substantially zero biasing force to said handle when said pivot arms are in their said lower positions, said tension pring being adapted to apply a retaining force to said operating handle when said pivot arms are in their said raised position.

14. A machine as defined in 5 wherein said truss frame arrangement is mounted on a side of the vehicle, and including means cooperative with said truss frame arrangement to prevent side moments from acting on the vehicle from said conveyor.

15. A machine as defined in claim 14 wherein said side moment preventing means includes a shock absorber mounted support wheel attached to said truss frame arrangement to underlie said inclined conveyor.

* * * * *